(12) United States Patent
Lawson

(10) Patent No.: US 10,217,347 B1
(45) Date of Patent: Feb. 26, 2019

(54) SYSTEM FOR MONITORING AND PROVIDING ALERTS

(71) Applicant: Robert William Lawson, West Sacramento, CA (US)

(72) Inventor: Robert William Lawson, West Sacramento, CA (US)

( * ) Notice: Subject to any disclaimer, the term of this patent is extended or adjusted under 35 U.S.C. 154(b) by 0 days.

(21) Appl. No.: 15/710,607

(22) Filed: Sep. 20, 2017

(51) Int. Cl.
  *G08B 21/24* (2006.01)
  *B60Q 9/00* (2006.01)
(52) U.S. Cl.
  CPC .......... *G08B 21/24* (2013.01); *B60Q 9/00* (2013.01)
(58) Field of Classification Search
  None
  See application file for complete search history.

(56) References Cited

U.S. PATENT DOCUMENTS

| 6,963,280 B2 | 11/2005 | Eskildsen | |
| 2010/0163731 A1* | 7/2010 | Haran | G08B 13/06 250/340 |
| 2015/0159401 A1 | 6/2015 | Patrick et al. | |
| 2016/0247370 A1 | 8/2016 | Lamb et al. | |
| 2016/0300415 A1* | 10/2016 | Deneen | E05F 15/668 |
| 2017/0175433 A1* | 6/2017 | Kang | E05F 15/77 |

* cited by examiner

*Primary Examiner* — An T Nguyen
(74) *Attorney, Agent, or Firm* — One LLP

(57) ABSTRACT

A system comprising at least one transmitter module, at least one receiver module, and at least one communication network. The transmitter module is placed on a barrier, wherein the transmitter module comprises a position detector. The receiver module is placed in a close proximity to a user, wherein the receiver module comprises a user alert feature. The receiver module may include a mobile device. The communication network is capable of providing a working communication between the transmitter module and the receiver module. The system is capable of monitoring and providing an alert if the barrier is left open by a user.

11 Claims, 7 Drawing Sheets

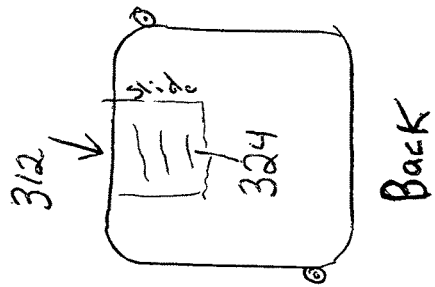
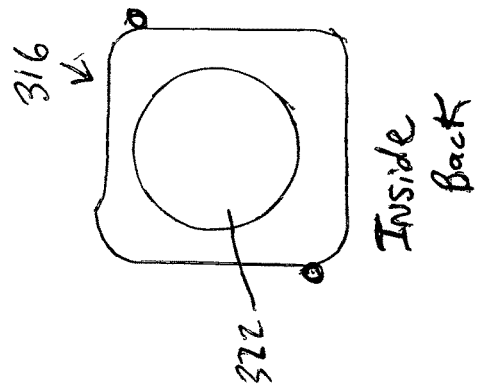
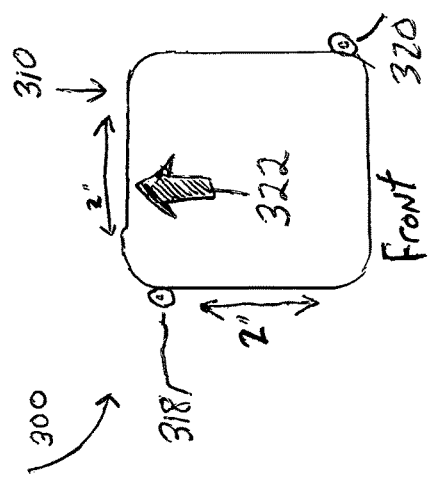
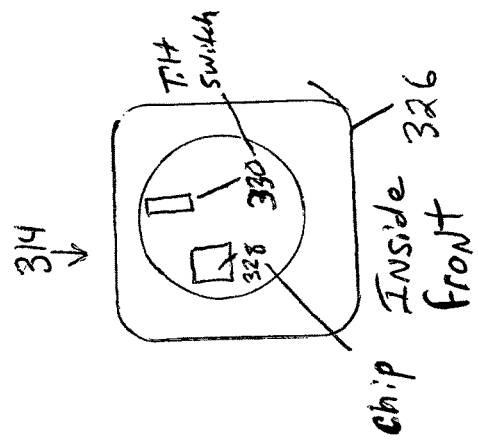
Fig. 3

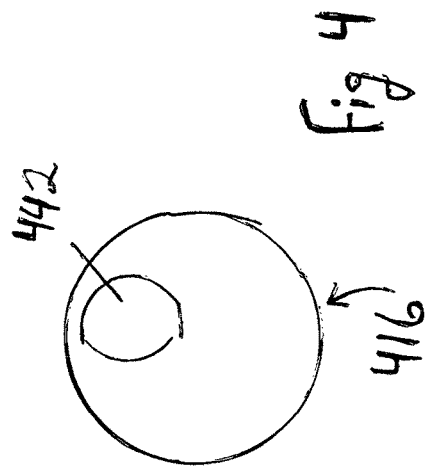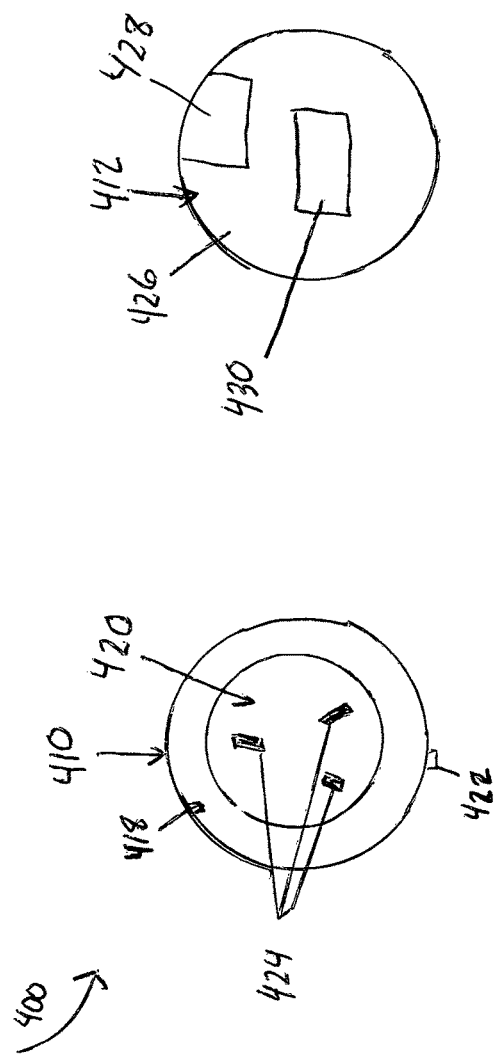

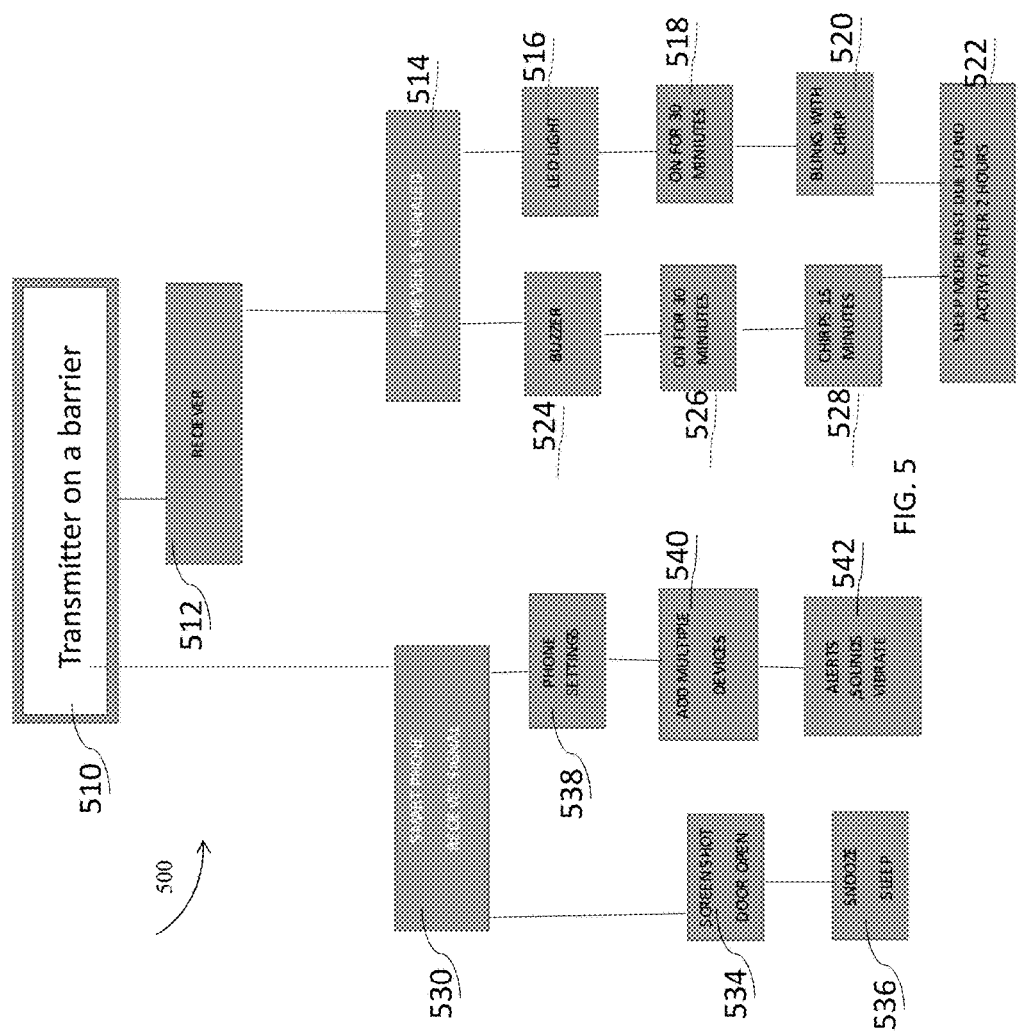

SYSTEM FOR MONITORING AND PROVIDING ALERTS

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a system and device for monitoring and providing alerts. More particularly, certain embodiments of the invention relate to a system and device for monitoring and providing alerts for loss prevention.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that there is an omnipresent danger of losing goods or possessions or causing accidents, on leaving doors unlocked or not properly locked. For example, garage doors, cargo container doors, swing doors, pet doors, out building doors, train freight doors, shed doors, barn doors, airplane hangar doors, tool box lids, etc. One can expect that the failure to close/lock doors particularly in transport vehicles engaged in goods transport may result in goods falling off the back of the vehicle without the driver being aware of such loss and may result in accidents. One may also expect such failures, accidents, and loss of goods if a lock in a locked goods transport vehicle opens up during travel due to a faulty lock design or wear and tear of locking system compounded with bad roads, etc.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an exemplary transmitter device for monitoring and providing alerts on open doors, in accordance with an embodiment of the present invention;

FIG. 4 illustrates an exemplary receiver device for monitoring and providing alerts on open doors, in accordance with an embodiment of the present invention;

FIG. 5 is a flow chart illustrating an exemplary process for monitoring and providing alerts on open doors, in accordance with an embodiment of the present invention;

Figure 1:
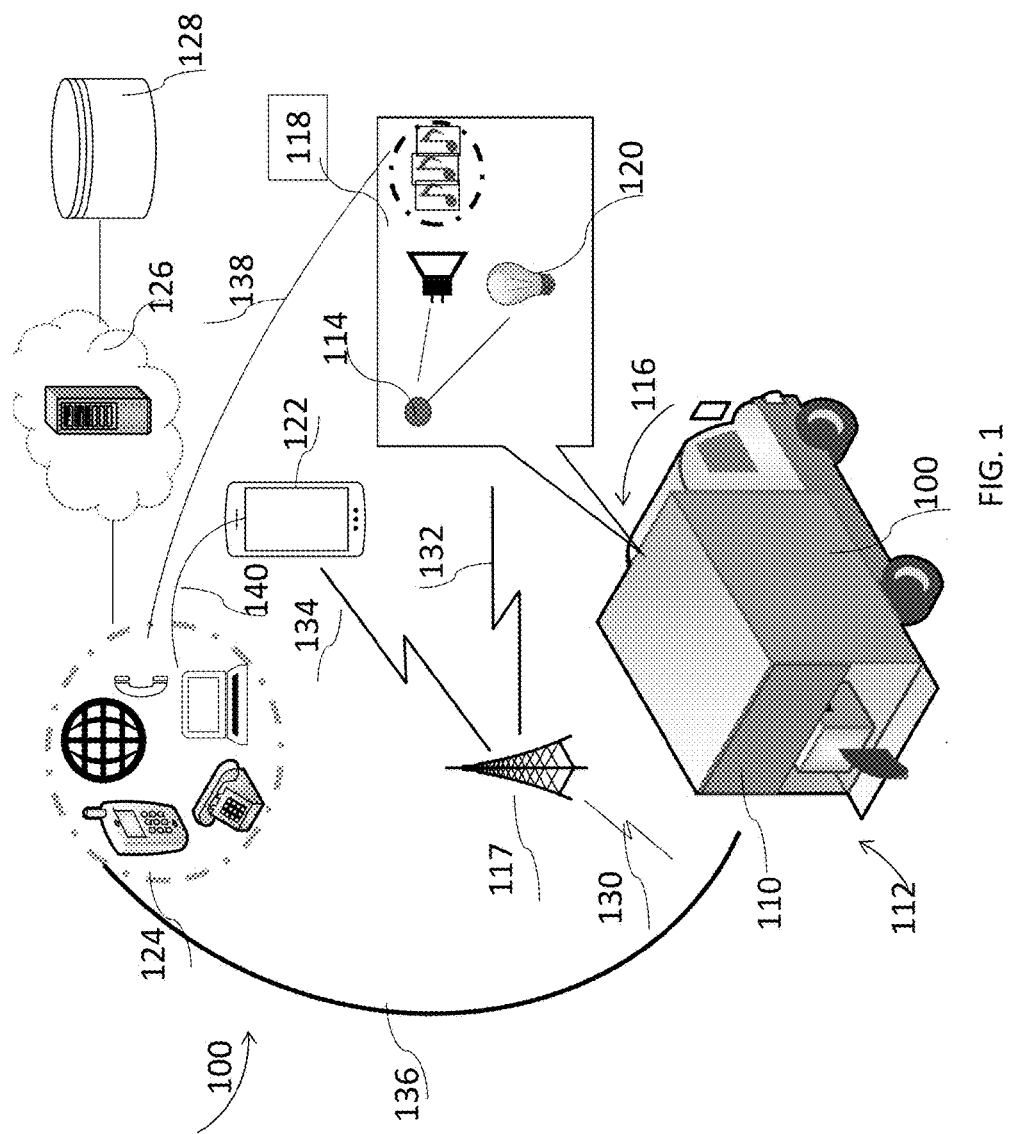
FIG. 1 illustrates an exemplary system for monitoring and providing alerts on open doors, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit "about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Referring to FIG. 1 is illustrated an exemplary system 100 for monitoring and providing alerts on open doors, in accordance with an embodiment of the present invention. In one exemplary embodiment, the system 100 may include a transmitter module 110 placed on a barrier 112, a receiver module 114 placed 116 in a close proximity to a user who needs to be alerted, and a wireless radio network 117 i.e., a communication network. In one embodiment, the transmitter module 110 and the receiver module 112 may communicate via the wireless radio network 117. It may be appreciated by a person with ordinary skill in the art, in light of and in accordance with the teachings of the present invention that in certain embodiments, the transmitter module and receiver module may communicate via other optical, wired or wireless methods including but not limited to long range radio signals, WIFI, WIMAX, and the like using appropriate hardware. In one embodiment, the transmitter module 110 may include a radio signal generator, BLUETOOTH®, a power source, a tilt switch, and a firmware i.e., a designated software program. As used herein the term firmware means "a permanent designated software program programmed into a read-only memory". In one embodiment, the receiver module 114 may include a radio signal receiver; alert modules, including but not limited to, a sound alert module 118, for example, an audible buzzer, and a visual alert module 120, for example, an alert light; a power source, a power source provider, and a designated software program. In one exemplary embodiment, the receiver module may include a mobile device 122 placed in close proximity to the user who needs to be alerted. The mobile device 122, may include, but is not limited to a mobile phone, handheld, a smart watch, a smart phone, a tablet, and a laptop. The mobile device 122 may include the visual alert module (not shown in figure) and/or the sound alert module (not shown in figure). In an exemplary embodiment, the system 100 may include a radio transmitter with a position detector, a radio receiver with a dual alert feature for alerting a user, and a mobile device having a designated software program with alert feature for alerting a user.

In certain embodiments, the signals sent by the transmitter may be communicated to a local area network 124 by the wireless radio network 117, and the local area network may then transmit the signals to the receiver module. In certain embodiments, the local area network may be connected to a server and a database. Statistical information on open doors may be saved in the server or database. Extra alerts may be provided to certain users on certain routes using certain vehicles where a repetition may be observed in leaving the door open.

During a typical working of the system for monitoring and providing alerts on open doors in a transport vehicle 100, a transmitter 110 may be placed on the barrier 112 i.e., the door of the transport vehicle 100. A receiver 114 may be placed on the dashboard 116 of the transport vehicle 100, such that when a user, for example, a driver, sits in the transport vehicle 100, any alert provided the radio transmitter 114 is audible 118 or visible 120 to the user. The transmitter 110 and the receiver 114 may be paired to each other. In an event, where the barrier 112 i.e., the door is open, the designated software program in the transmitter 110 may broadcast 130 a signal 132 to the receiver 114 via a wireless radio network 117. This indicates to the user that the position of the barrier may make the contents of the vehicle accessible to authorized and unauthorized personnel, or the contents of the vehicle may fall off when the vehicle is in motion. The receiver 114 in turn broadcasts an alert 118, 120 to the user using the designated software program in the receiver 114. In another embodiment, when the receiver may include a mobile device 122, the transmitter 110 may broadcast 130 a signal 134 to the mobile device 122, to indicate that the position of the barrier may make the contents of the vehicle accessible to authorized and unauthorized personnel, or the contents of the vehicle may fall off when the vehicle is in motion. The mobile device 122 then broadcasts an alert to the user. In yet another embodiment, the transmitter 110 may broadcast a signal 136 to the local area network 124. The local area network may then transmit the signal to the receiver 114 and/or the mobile device 122, which intron will provide the visual and or audible alerts to the user.

It may be appreciated by a person with ordinary skill in the art, in light of and in accordance with the teachings of the present invention that, the transmitter 110 and the receiver 114, and the mobile device 122, may include a computing system for executing the designated software program, i.e., the firm ware. The computing system may include virtually any computer device capable of capturing, determining, processing, and providing alerts when a barrier is left open by a user. Non-limiting examples of a transmitter may include any radio, optical, wired, or wireless communication hardware that is compatible with the communication hardware in the receiver. Non-limiting examples of a receiver may include any radio, optical, wired, or wireless communication hardware that is compatible with the communication hardware in the transmitter. Non-limiting examples of the mobile device may include a mobile phone, handheld, a smart watch, a smart phone, and a laptop. The computing system may include any computing platform that executes computer software and/or code from a non-transitory computer readable medium. The computing system may include a single device or multiple devices. In embodiments where the computing device is a single device all the functions of capturing information on status of barrier, determining status of barrier, processing, and formatting gathered information, transmitting/receiving alert signals, and providing the alert signals to the user, may be executed by the single computer system. In embodiments where the computing system includes multiple devices these functions may be distributed between the multiple devices. For example, the capturing information on status of barrier, determining status of barrier, processing, and formatting gathered information, transmitting the information may be done by one computing system and the receiving alert signals and providing the alert signals to the user may be executed by a second device. In one embodiment, the computing system includes multiple devices.

It may be appreciated by a person with ordinary skill in the art, in light of and in accordance with the teachings of the present invention, that the computing system may connect to any number of devices with virtually any wired and/or wireless means. The computing system may connect to virtually any device by means such as, but not limited to, Bluetooth connection, Ethernet cable, USB cable, WIFI, IRDA, etc. . . . In one embodiment, the computing system may connect to other devices for gathering information on user statistics, route statistics, etc. . . . where the barrier is left open more frequently for example.

It may be appreciated by a person with ordinary skill in the art, in light of and in accordance with the teachings of the present invention, that the visual alert module 120 may be any device capable of providing a visual alert to the user. Visual alert module 120 may include devices such as, but not limited to, an alert light, a visual display of the open barrier, a line display of the open barrier, etc. In another embodiment of the present invention, visual alert module 120 may be integrated with a display in proximity to the receiver for the user to have a clear display of the status of the barrier.

It may be appreciated by a person with ordinary skill in the art, in light of and in accordance with the teachings of the present invention, that the voice alert module 118 may be any device capable of providing an audible alert to the user. Voice alert module 118 may include devices such as, but not limited to, an alert buzzer, an alert music, etc. In another embodiment of the present invention, Voice alert module 118 may be integrated with a voice output device/amplifier in proximity to the receiver for the user to provide a louder voice output on the status of the barrier to the user.

It may be appreciated by a person with ordinary skill in the art, in light of and in accordance with the teachings of the present invention, the information on open barriers gathered may partially or completely be contained in a local computing platform and/or network. In an alternative embodiment of the present invention, the user information gathered may be located on a local computer network.

It may be appreciated by a person with ordinary skill in the art, in light of and in accordance with the teachings of the present invention, the sever may include cloud drive, data download web link, etc. . . . .

In an exemplary embodiment, the transmitter module and the receiver module may be connected using Bluetooth® connectivity.

Figure 2:
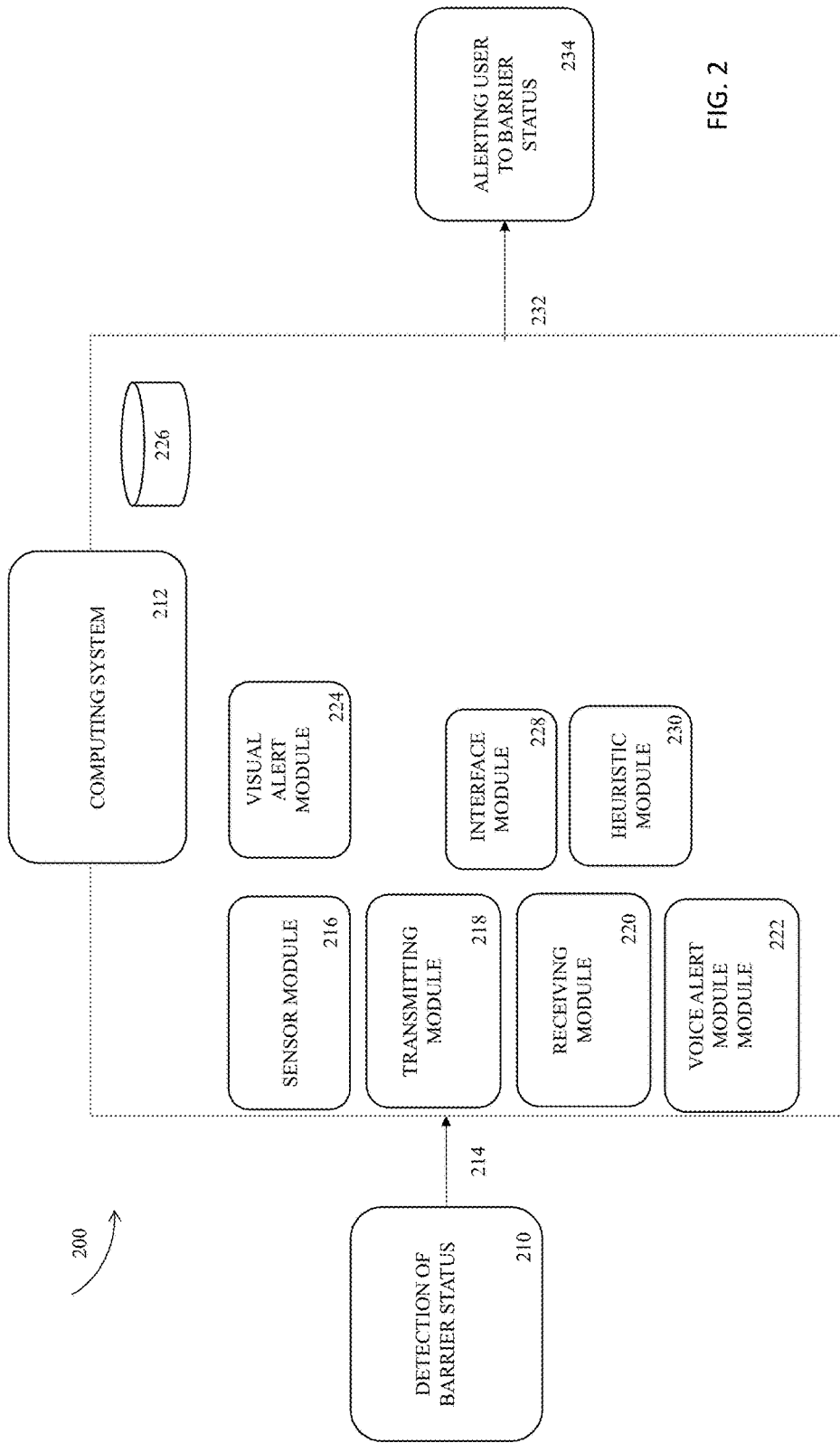
FIG. 2 illustrates an architecture of an exemplary system monitoring and providing alerts on open doors, in accordance with an embodiment of the present invention.

Referring to FIG. 2 is illustrated an architecture of an exemplary system for monitoring and providing alerts on open barriers, in accordance with an embodiment of the present invention. A monitoring and providing alerts on open barriers system architecture 200 may comprise a computing system 212. The computing system 212 includes, a sensor module 216, a transmitting module 218, a receiving module 220, a voice alert module 222, a visual alert module 224, a database 226, an interface module 228, and a heuristic module 230. In one embodiment, the input 214 information for the computing system 212 may be obtained from a transmitter that detects the status of a barrier 210, i.e., if the barrier is open and the goods inside a storage space covered by the barrier may be accessible to unauthorized personnel. The output 232 includes alerts to the user on the barrier status 234. The sensor module 216, may have a means of monitoring, sensing, and determining the status of a barrier, such as, without limitation, a processing unit, a computer, or a server to execute computer code and/or algorithms from a non-transitory computer readable medium for identifying if the barrier is open or closed. The transmitting module 218, may have a means of transmitting the status of the battier to the receiving module, such as, without limitation, a processing unit, a computer, or a server to execute computer code and/or algorithms from a non-transitory computer readable medium to indicate if the barrier is open and the goods/items inside are accessible to unauthorized personnel or may fall of while in motion. The receiving module 220, may have a means of receiving the transmissions from the transmitting module 218, such as, without limitation, a processing unit, a computer, or a server to execute computer code and/or algorithms from a non-transitory computer readable medium for identifying barrier status. The voice alert module 222, may have a means of providing an audible alert, such as, without limitation, a processing unit, a computer, or a server to execute computer code and/or algorithms from a non-transitory computer readable medium for audibly alerting the user. The visual alert module 224, may have a means of providing a visual alert, such as, without limitation, a processing unit, a computer, or a server to execute computer code and/or algorithms from a non-transitory computer readable medium for visually alerting the user. The interface module 236, may have a means of providing an interface, such as, without limitation, a processing unit, a computer, or a server to execute computer code and/or algorithms from a non-transitory computer readable medium to assist computing system in performing its various functions. The heuristic module 230, may have a means of self-learning, such as, without limitation, a processing unit, a computer, or a server to execute computer code and/or algorithms from a non-transitory computer readable medium to assist the assimilation of information for repetitive reasons when a barrier is left open like the same user not closing, barrier opening up due to a bad road on a given route, and the like.

The database 228 may be, but not limited to, a plurality of data servers, and a memory card. It may be appreciated by a person with ordinary skill in the art, in light of and in accordance with the teachings of the present invention, that the database may contain virtually any user data to assist the assimilation of information for repetitive reasons when a barrier is left open like the same user not closing, barrier opening up due to a bad road on a given route, and the like. In another embodiment, the user data may be stored in a memory card in the computing system 212.

It may be appreciated by a person with ordinary skill in the art, in light of and in accordance with the teachings of the present invention, that one or more modules may be embodied in a single device. In an alternative embodiment of the present invention, that one or more modules may be embodied in multiple devices.

It may be appreciated by a person with ordinary skill in the art, in light of and in accordance with the teachings of the present invention, that virtually any algorithm and/or computer code may be used to identify the status of a barrier and transmit the status to the receiving module. Device identification algorithms and/or methods may include, without limitation, Scatternet formation and the like.

It may be appreciated by a person with ordinary skill in the art, in light of and in accordance with the teachings of the present invention, that virtually any algorithm and/or computer code may be used to self-learn using the heuristic module 240. Self-learning algorithms and/or methods may include, without limitation, Scatternet formation and the like.

It may be appreciated by a person with ordinary skill in the art, in light of and in accordance with the teachings of the present invention, that there may be a plurality of the same modules in monitoring and providing alerts on an open-door system architecture 200. A plurality of modules such as, without limitation, a sensor module 216, a transmitting module 218, a receiving module 220, a voice alert module 222, a visual alert module 224, a database 226, an interface module 228, and a heuristic module 230, may be present in routing communication for a user system architecture 200. The plurality of similar modules may work in parallel or independently to improve the throughput and/or speed of monitoring and providing alerts on an open-door system architecture 200. In an alternative embodiment of the present invention, a plurality of identification, determining, alerting, interface, self-learning, and storage modules may be connected to a monitoring and providing alerts on an open-door system via wired and wireless connections to access resources from different wired and wireless networks. In still another alternative embodiment of the present invention, a plurality of similar modules may form a secondary monitoring and providing alerts on an open-door system capable of seamlessly substituting an errant module.

It may be appreciated by a person with ordinary skill in the art, in light of and in accordance with the teachings of the present invention, that any module for monitoring and providing alerts on an open-door system architecture 200 may perform data manipulation. Data manipulation such as, but not limited to, compression, encryption, formatting. In an alternative embodiment of the present invention, any module sending data may first compress the data prior to data transmission.

Referring to FIG. 3 is illustrated an exemplary transmitter module for monitoring and providing alerts on open doors, in accordance with an embodiment of the present invention. In FIG. 3 are shown four views of the transmitter module: view 410 a front view, view 312 a back view, view 314 an inside front view, and view 316 an inside back view. View 312 shows the front of the transmitter with; 1-10 outside housing front view transmitter with mounting loops 318, 320 and arrow 322 for mounting purposes. View 312 shows back side of transmitter with a battery replacement door 324. View 314 shows the inside portion of the front view with a transmitter PC board 326 with a chip tilt switch 330, and a power source, for example, a battery underneath the tilt switch (not shown in figure). View 316 shows the transmitter back open view of the battery 332. In one embodiment, the tilt switch is the component that when the roll up door moves it activates the tilt switch thus sending signal to receiver.

Referring to FIG. 4 is illustrated an exemplary receiver module for monitoring and providing alerts on open doors, in accordance with an embodiment of the present invention. In FIG. 4 are shown four views of the receiver module: view 410 a front view which shows the receiver outer cover 418, for example a polymer cover having a dimension of about 2 inches in diameter, a translucent light diffuser polymer in the center 420, a position 422 for connection a power cord charger; and visual alert module 424, for example red LED lights. View 412 shows the receiving module having a back polymer cover 426, a battery door 428, and a means to secure the receiver to a surface, for example, Velcro®. View 414 shows a receiver p.c. board 432 inside the receiver, with LED lights 434 and an antenna 436. View 414 also shows a battery charger 438 and a buzzer 440. View 416 shows the back view of the battery 442. P.C. board.

In one embodiment, the transmitter module may include a battery as a power source. In certain embodiments, the transmitter module may include a port for connecting to a power charger, wherein the power charger may use a power source from the location where the barrier needs to be monitored, power supply near storage door for storage door, power supply from vehicle for vehicle door, etc. In one embodiment, the receiver module may include a battery as a power source. In certain embodiments, the receiver module may include a port for connecting to a power charger, wherein the power charger may use a power source from the location in proximity to the where the user needs to be alerted on the barrier status, power supply from vehicle battery, etc.

FIG. 5 is a flow chart 500 illustrating an exemplary process for monitoring and providing alerts on open doors, in accordance with an embodiment of the present invention. In a first step 510 a transmitter module may be placed on a barrier that is to be monitored. It may be appreciated by a person with ordinary skill in the art, in light of and in accordance with the teachings of the present invention that as long as a door/barrier to be monitored is open the transmitter module will continue to broadcast and the LED on the receiver module may continue to provide visual alert, i.e., for example may be switched-ON, or may continue to blink, or the provide sound alert, i.e., buzzer goes into sleep mode. The transmitter module may then send a signal to a receiver module in a step 512 on detecting that a door/barrier is left open. On receiving the signal from the transmitter module in a step 3, the receiver module in a step 514, the receiver module will proceed to alert a user in at least two different ways. In one embodiment, the receiver module may translate the signal to a visual alert in step 516 and a LED light in the receiver module may be lit to alert the user. In step 518 the LED light remains switched on for about 30 minutes, and in step 520 the LED light may blink with or without combination with an audible alert, for example a chirp. After about two hours if the receiver module senses no activity then in step 522 the receiver module shuts off the LED light and may go into sleep mode. In one embodiment, the receiver module may translate the signal to an audio alert in step 524 and a buzzer in the receiver module may be lit to alert the user. In step 526 the buzzer remains switched on for about 30 minutes, and in step 528 the buzzer may chirp for about 15 minutes. After about two hours if the receiver module senses no activity then in step 522 the receiver module shuts off the LED light and may go into sleep mode.

In an exemplary embodiment, where the receiving module may include a mobile device, for example a smart phone, in a step 530 the mobile device may receive a signal form the transmitter module on a door being open. The mobile device in step 532 may then send a visual alert to the user in the form of a screen shot of the open door. In step 536 the transmitter is constantly sending a signal While receiving a signal that door is open on the smart phone the user may hit a snooze button that makes the alert go silent for a brief time period, for example, for about 3 minutes or shut it off completely in the case of a driver backing up his truck to a dock and leaving the door open while loading after a set time by the factory it will stop buzzing and only light will blink as a reminder to the driver the door is open and the visual alert may remind the driver to close the door before driving away. In an alternative embodiment, the via the designated software program may be installed in a mobile phone or a smart phone as a mobile application and the device may be linked with the mobile phone or smart phone. The smartphone may then provide menu options to the driver or user, i.e., Once the mobile application is downloaded the application may prompt the user/driver to access phone setting 538 i.e., run in back ground, then may prompt the user to access menu options 540 to add at least one or a multiple of devices for linking to a smart phone, then may prompt the user to set alerts, including audio i.e., sound/vibrate and visual alerts, at user/driver discretion.

The system disclosed herein may include certain advantages. The system may be economically advantageous as it may prevent loss of goods and hence loss of money if the doors were to be left open. The system employs a two module (a transmitter and a receiver) with a mobile app that alerts the driver or a user as to whether his truck freight door is open or closed. The system may prevent loss of time which may otherwise be spent in needing to double check the truck freight door which may increase revenue for the company by improving delivery schedules and route efficiency, reducing liability and insurance claims due to product falling out of truck. The system may help eliminate or at least minimize human error of leaving the door open.

It may be appreciated by a person with ordinary skill in the art, in light of and in accordance with the teachings of the present invention that, for the system to work a transmitter and a receiver may be needed. In certain embodiments, the system may be marketed as a device including a transmitter and a receiver for wireless trailer door monitor and cab alert system with the mobile device applications. In certain embodiments, the receivers may be inbuilt in the vehicle and the transmitters may be later paired with the receivers. In certain embodiments, the transmitter may be paired with the mobile device. In certain embodiments, the transmitter may be paired with the receiver on a vehicle and with the mobile device.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 6:
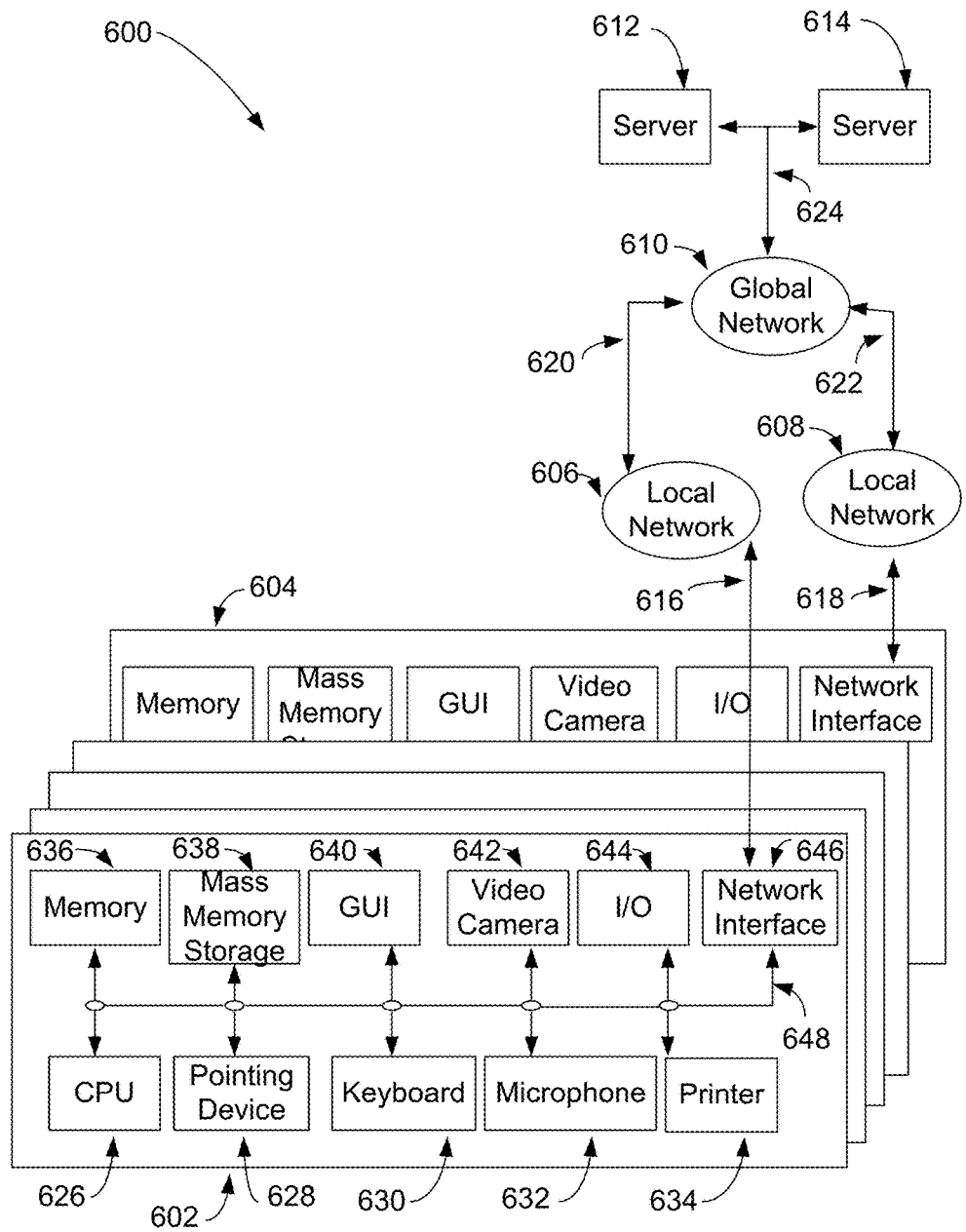
FIG. 6 is a block diagram depicting an exemplary client/server system which may be used by an exemplary web-enabled/networked embodiment of the present invention.

FIG. 6 is a block diagram depicting an exemplary client/server system which may be used by an exemplary web-enabled/networked embodiment of the present invention.

A communication system 600 includes a multiplicity of clients with a sampling of clients denoted as a client 602 and a client 604, a multiplicity of local networks with a sampling of networks denoted as a local network 606 and a local network 608, a global network 610 and a multiplicity of servers with a sampling of servers denoted as a server 612 and a server 614.

Client 602 may communicate bi-directionally with local network 606 via a communication channel 616. Client 604 may communicate bi-directionally with local network 608 via a communication channel 618. Local network 606 may communicate bi-directionally with global network 610 via a communication channel 620. Local network 608 may communicate bi-directionally with global network 610 via a communication channel 622. Global network 610 may communicate bi-directionally with server 612 and server 614 via a communication channel 624. Server 612 and server 614 may communicate bi-directionally with each other via communication channel 624. Furthermore, clients 602, 604, local networks 606, 608, global network 610 and servers 612, 614 may each communicate bi-directionally with each other.

In one embodiment, global network 610 may operate as the Internet. It will be understood by those skilled in the art that communication system 600 may take many different forms. Non-limiting examples of forms for communication system 600 include local area networks (LANs), wide area networks (WANs), wired telephone networks, wireless networks, or any other network supporting data communication between respective entities.

Clients 602 and 604 may take many different forms. Non-limiting examples of clients 602 and 604 include personal computers, personal digital assistants (PDAs), cellular phones and smartphones.

Client 602 includes a CPU 626, a pointing device 628, a keyboard 630, a microphone 632, a printer 634, a memory 636, a mass memory storage 638, a GUI 640, a video camera 642, an input/output interface 644 and a network interface 646.

CPU 626, pointing device 628, keyboard 630, microphone 632, printer 634, memory 636, mass memory storage 638, GUI 640, video camera 642, input/output interface 644 and network interface 646 may communicate in a unidirectional manner or a bi-directional manner with each other via a communication channel 648. Communication channel 648 may be configured as a single communication channel or a multiplicity of communication channels.

CPU 626 may be comprised of a single processor or multiple processors. CPU 626 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 636 is used typically to transfer data and instructions to CPU 626 in a bi-directional manner. Memory 636, as discussed previously, may include any suitable computer-readable media, intended for data storage, such as those described above excluding any wired or wireless transmissions unless specifically noted. Mass memory storage 638 may also be coupled bi-directionally to CPU 626 and provides additional data storage capacity and may include any of the computer-readable media described above. Mass memory storage 638 may be used to store programs, data and the like and is typically a secondary storage medium such as a hard disk. It will be appreciated that the information retained within mass memory storage 638, may, in appropriate cases, be incorporated in standard fashion as part of memory 636 as virtual memory.

CPU 626 may be coupled to GUI 640. GUI 640 enables a user to view the operation of computer operating system and software. CPU 626 may be coupled to pointing device 628. Non-limiting examples of pointing device 628 include computer mouse, trackball and touchpad. Pointing device 628 enables a user with the capability to maneuver a computer cursor about the viewing area of GUI 640 and select areas or features in the viewing area of GUI 640. CPU 626 may be coupled to keyboard 630. Keyboard 630 enables a user with the capability to input alphanumeric textual information to CPU 626. CPU 626 may be coupled to microphone 632. Microphone 632 enables audio produced by a user to be recorded, processed and communicated by CPU 626. CPU 626 may be connected to printer 634. Printer 634 enables a user with the capability to print information to a sheet of paper. CPU 626 may be connected to video camera 642. Video camera 642 enables video produced or captured by user to be recorded, processed and communicated by CPU 626.

CPU 626 may also be coupled to input/output interface 644 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 626 optionally may be coupled to network interface 646 which enables communication with an external device such as a database or a computer or telecommunications or internet network using an external connection shown generally as communication channel 616, which may be implemented as a hardwired or wireless communications link using suitable conventional technologies. With such a connection, CPU 626 might receive information from the network, or might output information to a network in the course of performing the method steps described in the teachings of the present invention.

Figure 7:
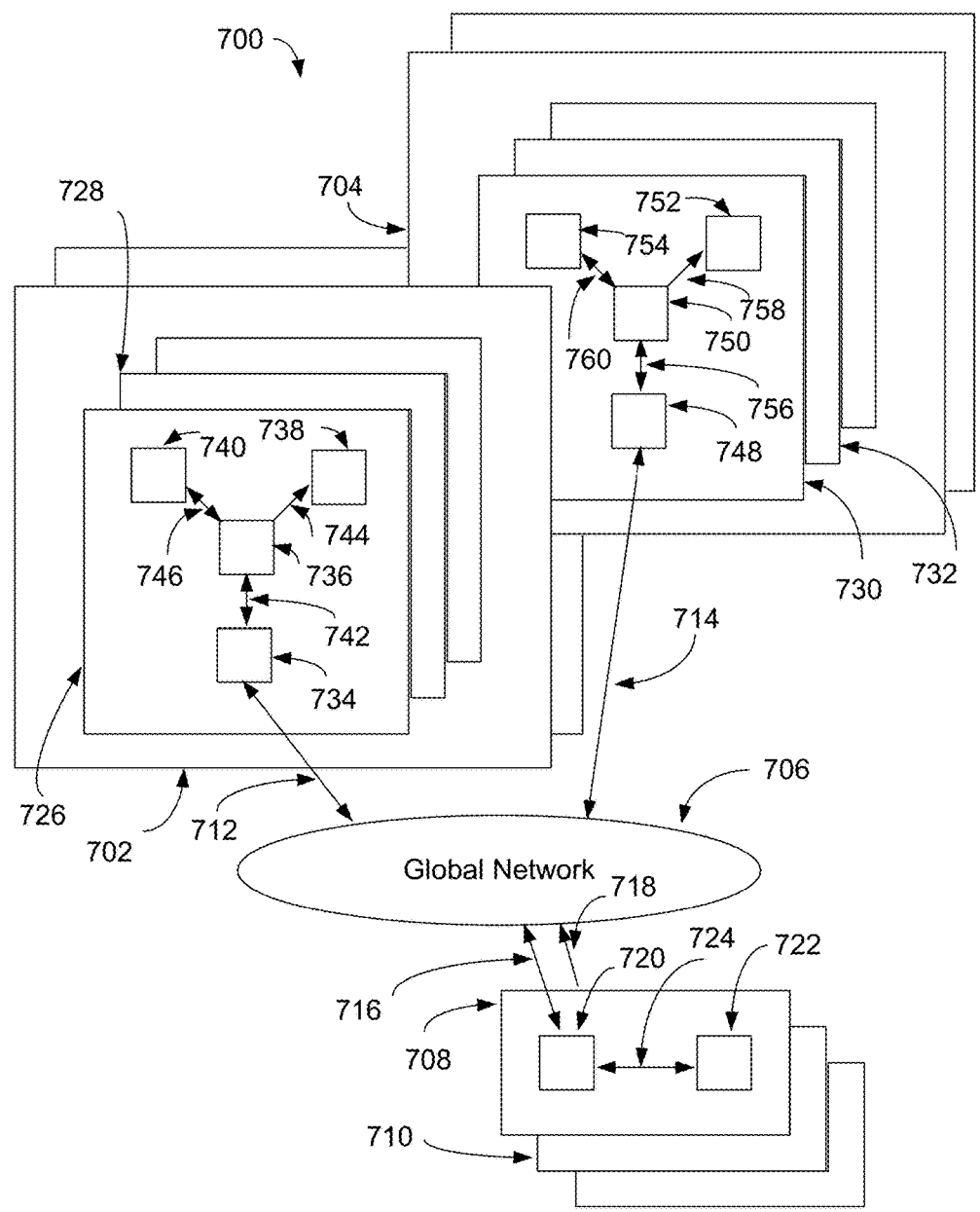
FIG. 7 illustrates a block diagram depicting a conventional client/server communication system.

FIG. 7 illustrates a block diagram depicting a conventional client/server communication system, which may be used by an exemplary web-enabled/networked embodiment of the present invention.

A communication system 700 includes a multiplicity of networked regions with a sampling of regions denoted as a network region 702 and a network region 704, a global network 706 and a multiplicity of servers with a sampling of servers denoted as a server device 708 and a server device 710.

Network region 702 and network region 704 may operate to represent a network contained within a geographical area or region. Non-limiting examples of representations for the geographical areas for the networked regions may include postal zip codes, telephone area codes, states, counties, cities and countries. Elements within network region 702 and 704 may operate to communicate with external elements within other networked regions or within elements contained within the same network region.

In some implementations, global network 706 may operate as the Internet. It will be understood by those skilled in the art that communication system 700 may take many different forms. Non-limiting examples of forms for communication system 700 include local area networks (LANs), wide area networks (WANs), wired telephone networks, cellular telephone networks or any other network supporting data communication between respective entities via hardwired or wireless communication networks. Global network 706 may operate to transfer information between the various networked elements.

Server device 708 and server device 710 may operate to execute software instructions, store information, support database operations and communicate with other networked elements. Non-limiting examples of software and scripting languages which may be executed on server device 708 and server device 710 include C, C++, C# and Java.

Network region 702 may operate to communicate bi-directionally with global network 706 via a communication channel 712. Network region 704 may operate to communicate bi-directionally with global network 706 via a communication channel 714. Server device 708 may operate to communicate bi-directionally with global network 706 via a communication channel 716. Server device 710 may operate to communicate bi-directionally with global network 706 via a communication channel 718. Network region 702 and 704, global network 706 and server devices 708 and 710 may operate to communicate with each other and with every other networked device located within communication system 700.

Server device 708 includes a networking device 720 and a server 722. Networking device 720 may operate to communicate bi-directionally with global network 706 via communication channel 716 and with server 722 via a communication channel 724. Server 722 may operate to execute software instructions and store information.

Network region 702 includes a multiplicity of clients with a sampling denoted as a client 726 and a client 728. Client 726 includes a networking device 734, a processor 736, a GUI 738 and an interface device 740. Non-limiting examples of devices for GUI 738 include monitors, televisions, cellular telephones, smartphones and PDAs (Personal Digital Assistants). Non-limiting examples of interface device 740 include pointing device, mouse, trackball, scanner and printer. Networking device 734 may communicate bi-directionally with global network 706 via communication channel 712 and with processor 736 via a communication channel 742. GUI 738 may receive information from processor 736 via a communication channel 744 for presentation to a user for viewing. Interface device 740 may operate to send control information to processor 736 and to receive information from processor 736 via a communication channel 746. Network region 704 includes a multiplicity of clients with a sampling denoted as a client 730 and a client 732. Client 730 includes a networking device 748, a processor 750, a GUI 752 and an interface device 754. Non-limiting examples of devices for GUI 738 include monitors, televisions, cellular telephones, smartphones and PDAs (Personal Digital Assistants). Non-limiting examples of interface device 740 include pointing devices, mousse, trackballs, scanners and printers. Networking device 748 may communicate bi-directionally with global network 706 via communication channel 714 and with processor 750 via a communication channel 756. GUI 752 may receive information from processor 750 via a communication channel 758 for presentation to a user for viewing. Interface device 754 may operate to send control information to processor 750 and to receive information from processor 750 via a communication channel 760.

For example, consider the case where a user interfacing with client 726 may want to execute a networked application. A user may enter the IP (Internet Protocol) address for the networked application using interface device 740. The IP address information may be communicated to processor 736 via communication channel 746. Processor 736 may then communicate the IP address information to networking device 734 via communication channel 742. Networking device 734 may then communicate the IP address information to global network 706 via communication channel 712. Global network 706 may then communicate the IP address information to networking device 720 of server device 708 via communication channel 716. Networking device 720 may then communicate the IP address information to server 722 via communication channel 724. Server 722 may receive the IP address information and after processing the IP address information may communicate return information to networking device 720 via communication channel 724. Networking device 720 may communicate the return information to global network 706 via communication channel 716. Global network 706 may communicate the return information to networking device 734 via communication channel 712. Networking device 734 may communicate the return information to processor 736 via communication channel 742. Processor 736 may communicate the return information to GUI 738 via communication channel 744. User may then view the return information on GUI 738.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing open door/barrier monitoring and alerting system according to the present invention will be apparent to those skilled in the art. Various aspects of the invention have been described above by way of illustration, and the specific embodiments disclosed are not intended to limit the invention to the particular forms disclosed. The particular implementation of the open door/barrier monitoring and alerting system may vary depending upon the particular context or application. By way of example, and not limitation, the open door/barrier monitoring and alerting system described in the foregoing were principally directed to freight transport truck implementations; however, similar techniques may instead be applied to garage doors, cargo container doors, swing doors, pet doors, out building doors, train freight doors, shed doors, barn doors, airplane hangar doors, tool box lids, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

The invention claimed is:

1. A system comprising:
   at least one transmitter module comprising a position detector, wherein the transmitter module is affixed to a transport vehicle door, wherein the a position detector is configured to detect an open status of the door;
   at least one receiver module within the vehicle and within a close proximity and accessible to a driver of the vehicle, wherein the receiver module comprises an alert module configured to generate a user alert selected from a visual alert, a sound alert, or a combination thereof;
   a computing system comprising a database, the database comprises statistical information on door-open signals and on users; and
   at least one communication network, configured to provide a working communication between the transmitter module and the receiver module, the transmitter module and the computing system, and the computing system and the receiver module;
   wherein the transmitter module is configured to transmit a door-open signal to the receiver module and the computing system when the door is open;
   wherein the receiver module is configured to provide a visual alert, a sound alert, or a combination of a visual alert and a sound alert when the door-open signal is received; and
   wherein the computing system is configured to identify a door-open signal associated with a user having a history of unwanted door-open signals and to transmit an extra alert signal to the receiver module so as to provide the extra alert to the user having a history of unwanted door-open signals.

2. The system of claim 1, wherein the vehicle is a freight, delivery, or transport vehicle.

3. The system of claim 1, wherein at least one communication network is a wireless communication network.

4. The system of claim 3, wherein the wireless communication network comprises at least one of a wireless radio network, Wi-Fi network, and Wi-Max network.

5. The system of claim 1, wherein the transmitter module comprises a radio signal generator, a power source, a tilt switch.

6. The system of claim 1, wherein the transmitter module and the receiver module are paired.

7. The system of claim 6, wherein the receiver module is configured to receive the door-open signal directly from the transmitter module.

8. The system of claim 1, wherein the receiver module comprises a radio signal receiver configured to receive the door-open signal from the at least one communication network.

9. The system of claim 1, wherein the receiver module comprises a mobile device selected from the group consisting of a mobile phone, handheld, a smart watch, a smart phone, a tablet, and a laptop, wherein the mobile device is communication contact with the at least one communication network.

10. The system of claim 1, wherein the system further comprises a mobile device selected from the group consisting of a mobile phone, handheld, a smart watch, a smart phone, a tablet, and a laptop, wherein the mobile device is communication contact with the at least one communication network.

11. The system of claim 1, wherein the system further comprises a mobile device selected from the group consisting of a mobile phone, handheld, a smart watch, a smart phone, a tablet, and a laptop, and wherein the computing system is configured to transmit the extra alert signal to the mobile device.

* * * * *